(12) United States Patent
Marker et al.

(10) Patent No.: US 7,982,075 B2
(45) Date of Patent: *Jul. 19, 2011

(54) PRODUCTION OF DIESEL FUEL FROM BIORENEWABLE FEEDSTOCKS WITH LOWER HYDROGEN CONSUMPTION

(75) Inventors: Terry L. Marker, Palos Heights, IL (US); Peter Kokayeff, Naperville, IL (US); Suheil F. Abdo, Lincolnshire, IL (US); Franco Baldiraghi, Melegnano (IT); Luigina M. F. Sabatino, Milan (IT)

(73) Assignees: UOP LLC, Des Plaines, IL (US); ENI S.p.A., Rome (IT)

( * ) Notice: Subject to any disclaimer, the term of this patent is extended or adjusted under 35 U.S.C. 154(b) by 296 days.

This patent is subject to a terminal disclaimer.

(21) Appl. No.: 12/193,120

(22) Filed: Aug. 18, 2008

(65) Prior Publication Data

US 2009/0193709 A1 Aug. 6, 2009

Related U.S. Application Data

(60) Provisional application No. 60/973,800, filed on Sep. 20, 2007.

(51) Int. Cl.
*C07C 1/20* (2006.01)
*C07C 4/00* (2006.01)

(52) U.S. Cl. ........................................ 585/240; 585/242

(58) Field of Classification Search .................. 585/240, 585/241, 242
See application file for complete search history.

(56) References Cited

U.S. PATENT DOCUMENTS

| 3,230,165 | A | * | 1/1966 | Cunningham | 208/89 |
| 5,186,722 | A | | 2/1993 | Cantrell et al. | |
| 5,705,722 | A | | 1/1998 | Monnier et al. | |
| 7,232,935 | B2 | | 6/2007 | Jakkula et al. | |
| 7,279,018 | B2 | | 10/2007 | Jakkula et al. | |
| 7,402,236 | B2 | * | 7/2008 | Miller et al. | 208/27 |
| 7,425,657 | B1 | | 9/2008 | Elliott et al. | |
| 7,459,597 | B2 | | 12/2008 | Koivusalmi et al. | |
| 7,491,858 | B2 | * | 2/2009 | Murzin et al. | 585/240 |
| 7,501,546 | B2 | | 3/2009 | Koivusalmi et al. | |
| 7,511,181 | B2 | * | 3/2009 | Petri et al. | 585/240 |
| 7,540,952 | B2 | | 6/2009 | Pinho et al. | |
| 7,550,634 | B2 | * | 6/2009 | Yao et al. | 585/240 |
| 2005/0205462 | A1 | | 9/2005 | Gopalakrishnan et al. | |

(Continued)

FOREIGN PATENT DOCUMENTS

CN 11270300 A 9/2008

(Continued)

OTHER PUBLICATIONS

FI 110248B—Certified English Translation of the Patent as set forth above as Foreign Patent Document.*

(Continued)

*Primary Examiner* — N. Bhat
(74) *Attorney, Agent, or Firm* — Maryann Maas

(57) ABSTRACT

A process has been developed for producing diesel boiling range fuel from renewable feedstocks such as plant and animal fats and oils. The process involves treating a renewable feedstock by hydrogenating and deoxygenating i.e. decarboxylating, decarbonylating, and hydrodeoxygenating to provide a hydrocarbon fraction useful as a diesel boiling range fuel. A sulfur containing component is added to drive the conversion preferentially through carbonylation and carbonylation with reduced hydrodeoxygenation. If desired, the hydrocarbon fraction can be isomerized to improve cold flow properties.

28 Claims, 4 Drawing Sheets

U.S. PATENT DOCUMENTS

| | | | |
|---|---|---|---|
| 2006/0186020 A1* | 8/2006 | Gomes | 208/46 |
| 2006/0207166 A1 | 9/2006 | Herskowitz et al. | |
| 2006/0264684 A1* | 11/2006 | Petri et al. | 585/250 |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |
| 2007/0135666 A1 | 6/2007 | Koivusalmi et al. | |
| 2007/0161832 A1 | 7/2007 | Myllyoja et al. | |
| 2007/0170091 A1 | 7/2007 | Monnier et al. | |
| 2007/0175795 A1 | 8/2007 | Yao et al. | |
| 2007/0260102 A1* | 11/2007 | Duarte Santiago et al. | 585/733 |
| 2007/0281875 A1 | 12/2007 | Scheibel et al. | |
| 2007/0287873 A1 | 12/2007 | Coupard et al. | |
| 2007/0299291 A1 | 12/2007 | Koivusalmi | |
| 2008/0025903 A1 | 1/2008 | Cortright | |
| 2008/0033188 A1 | 2/2008 | Dumesic et al. | |
| 2008/0045731 A1 | 2/2008 | Zhang | |
| 2008/0050792 A1 | 2/2008 | Zmierczak et al. | |
| 2008/0052983 A1 | 3/2008 | Aulich et al. | |
| 2008/0066374 A1 | 3/2008 | Herskowitz | |
| 2008/0092436 A1 | 4/2008 | Seames et al. | |
| 2008/0132435 A1 | 6/2008 | Ferreira Fontes et al. | |
| 2008/0156694 A1 | 7/2008 | Chapus et al. | |
| 2008/0161614 A1* | 7/2008 | Bertoncini et al. | 585/240 |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0216391 A1 | 9/2008 | Cortright et al. | |
| 2008/0229654 A1 | 9/2008 | Bradin | |
| 2008/0244962 A1 | 10/2008 | Abhari et al. | |
| 2008/0281134 A1 | 11/2008 | Ghonasgi et al. | |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2008/0308457 A1 | 12/2008 | Dindi et al. | |
| 2008/0308458 A1 | 12/2008 | Dindi et al. | |
| 2008/0312480 A1 | 12/2008 | Dindi et al. | |
| 2008/0313955 A1 | 12/2008 | Silva et al. | |
| 2009/0014354 A1 | 1/2009 | Knuuttila et al. | |
| 2009/0019763 A1 | 1/2009 | Ghonasgi et al. | |
| 2009/0029427 A1 | 1/2009 | Miller | |
| 2009/0031617 A1 | 2/2009 | O'Rear | |
| 2009/0062578 A1 | 3/2009 | Koivusalmi et al. | |
| 2009/0069610 A1 | 3/2009 | Roberts, IV et al. | |
| 2009/0071872 A1 | 3/2009 | Ginosar et al. | |
| 2009/0077864 A1 | 3/2009 | Marker et al. | |
| 2009/0077865 A1 | 3/2009 | Kalnes et al. | |
| 2009/0077866 A1 | 3/2009 | Kalnes et al. | |
| 2009/0077867 A1 | 3/2009 | Marker et al. | |
| 2009/0077868 A1 | 3/2009 | Brady et al. | |
| 2009/0078611 A1 | 3/2009 | Marker et al. | |
| 2009/0082603 A1 | 3/2009 | Kalnes et al. | |
| 2009/0082606 A1 | 3/2009 | Marker et al. | |
| 2009/0084026 A1 | 4/2009 | Miller | |
| 2009/0088351 A1 | 4/2009 | Miller | |
| 2009/0107033 A1 | 4/2009 | Gudde et al. | |
| 2009/0124839 A1 | 5/2009 | Dumesic et al. | |
| 2009/0126260 A1 | 5/2009 | Aravanis et al. | |

FOREIGN PATENT DOCUMENTS

| | | | |
|---|---|---|---|
| CN | 11343552 A | | 1/2009 |
| EP | 1719811 A1 | | 8/2006 |
| EP | 1741767 | * | 10/2007 |
| EP | 2046917 | | 1/2008 |
| FI | 100248 B | * | 10/1997 |
| WO | WO 2007/064019 A1 | | 6/2007 |
| WO | WO 2007063874 A1 | | 6/2007 |
| WO | WO 2007064015 A1 | | 6/2007 |
| WO | WO 2007/125332 A1 | | 11/2007 |
| WO | WO 2007/141293 A1 | | 12/2007 |
| WO | WO 2008/012415 A2 | | 1/2008 |
| WO | WO 2008/020048 A2 | | 2/2008 |
| WO | WO 2008/053284 A1 | | 5/2008 |
| WO | WO 2008/101945 A1 | | 8/2008 |
| WO | WO 2008/105518 A1 | | 9/2008 |
| WO | WO 2008/119895 A2 | | 9/2008 |
| WO | WO 2008/141830 A1 | | 11/2008 |
| WO | WO 2008/141831 A1 | | 11/2008 |
| WO | WO 2008/151792 A1 | | 12/2008 |
| WO | WO 2008/152199 A1 | | 12/2008 |
| WO | WO 2009/004181 A2 | | 1/2009 |
| WO | WO 2009/011639 A2 | | 1/2009 |
| WO | WO 2009/013233 A2 | | 1/2009 |
| WO | WO 2009/020055 A1 | | 2/2009 |
| WO | WO 2009/025542 A1 | | 2/2009 |
| WO | WO 2009/059819 A1 | | 5/2009 |
| WO | WO 2009/059920 A2 | | 5/2009 |

OTHER PUBLICATIONS

PCT International Search Report and Written Opinion for PCT/US2008/076972 dated Jan. 30, 2009; 7 pages.

* cited by examiner

US 7,982,075 B2

PRODUCTION OF DIESEL FUEL FROM BIORENEWABLE FEEDSTOCKS WITH LOWER HYDROGEN CONSUMPTION

CROSS-REFERENCE TO RELATED APPLICATION

This applications claims priority from Provisional Application Ser. No. 60/973,800 filed Sep. 20, 2007, the contents of which are hereby incorporated by reference in its entirety.

UOP LLC, a limited liability company of the state of Delaware and ENI S.p.A. Refining and Marketing Division, a company incorporated under the laws of Italy, are parties to a joint research agreement.

FIELD OF THE INVENTION

This invention relates to a process for producing hydrocarbons useful as diesel boiling range fuel from renewable feedstocks such as the glycerides and free fatty acids found in materials such as plant oils, fish oils, animal fats, and greases. The process involves hydrogenation, decarboxylation, decarbonylation and hydrodeoxygenation optionally followed by isomerization in one or more reactors. A sulfur containing component is added to the deoxygenation reaction mixture to increase the amount of decarboxylation and decarbonylation occurring relative to the amount of hydrogenation and hydrodeoxygenation occurring, thus reducing the hydrogen consumption.

BACKGROUND OF THE INVENTION

As the demand for diesel boiling range fuel and fuel blending components increases worldwide there is increasing interest in sources other than petroleum crude oil for producing diesel boiling range fuel. One such source is what has been termed renewable sources. These renewable sources include, but are not limited to, plant oils such as corn, rapeseed, canola, soybean and algal oils, animal fats such as tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. The aliphatic carbon chains in the glycerides or FFAs can be saturated or mono-, di- or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as paraxylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises one or more steps to hydrogenate, decarboxylate, decarbonylate, (and/or hydrodeoxygenate) and isomerize the renewable feedstock. The consumption of hydrogen in the deoxygenation reaction zone is reduced by driving more of the conversion to occur through decarboxylation and decarbonylation which, unlike hydrogenation and hydrodeoxygenation, does not consume hydrogen. At least one sulfur containing component is added in an amount sufficient to increase the amount of decarboxylation and decarbonylation relative to the hydrogenation and hydrodeoxygenation. The sulfur containing component also operates to maintain the catalyst in a sulfided state.

SUMMARY OF THE INVENTION

A hydroconversion process for producing an isoparaffin-rich diesel boiling range product from a renewable feedstock wherein the process comprises treating the renewable feedstock in a reaction zone in the presence of greater than 1000 ppm of a sulfur containing component by hydrogenating and deoxygenating the renewable feedstock at reaction conditions to provide a first reaction product comprising a hydrocarbon fraction comprising n-paraffins. The sulfur containing component is present in an amount sufficient to preferentially drive decarbonylation and decarboxylation as compared to hydrogenation and hydrodeoxygenation. The carbon dioxide and water generated as byproducts in the first reaction zone may be removed from the first reaction product in an integrated hot high pressure stripper using hydrogen as the stripping gas. The hydrogen stripped first reaction product is optionally conducted to a hydroisomerization reaction zone. The isomerized product is recovered.

BRIEF DESCRIPTION OF THE DRAWINGS

FIG. 1 is a more simplistic schematic, while FIG. 2 is more detailed.

DETAILED DESCRIPTION OF THE INVENTION

Figure 1:
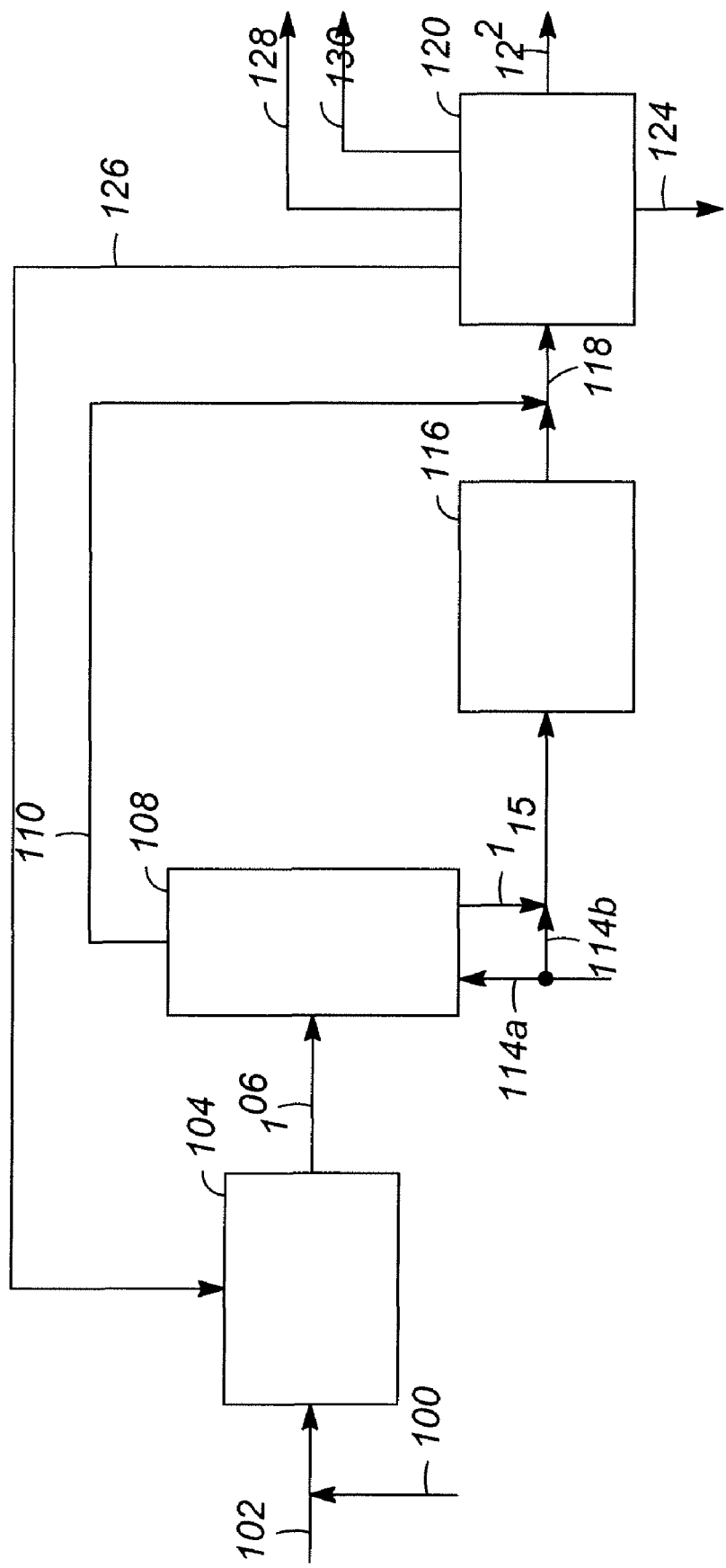
FIG. 1 and FIG. 2 are schematics of one embodiment of the invention.

As stated, the present invention relates to a process for producing a hydrocarbon stream useful as diesel boiling range fuel or fuel blending component from renewable feedstocks such as biorenewable feedstocks originating from plants or animals. The term renewable feedstock is meant to include feedstocks other than those derived from petroleum crude oil. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, jatropha oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what may have been considered to be a waste product from a petroleum based or other process into a valuable co-feed component to the current process.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826, hereby incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art such as nickel or nickel/molybdenum dispersed on a high surface area support. Other hydrogenation or hydrotreating catalysts include one or more noble metal catalytic elements dispersed on a high surface area support. Non-limiting examples of noble metals include Pt and/or Pd dispersed on gamma-alumina. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation or hydrotreating catalysts enumerated above are also capable of catalyzing decarboxylation, decarbonylation and/or hydrodeoxygenation of the feedstock to remove oxygen. Decarboxylation, decarbonylation, and hydrodeoxygenation are herein collectively referred to as deoxygenation reactions. Decarboxylation conditions include a relatively low pressure of about 3447 kPa (500 psia) to about 6895 kPa (1000 psia), a temperature of about 200° C. to about 400° C. and a liquid hourly space velocity of about 0.5 to about 10 $hr^{-1}$. In another embodiment the decarboxylation conditions include the same relatively low pressure of about 3447 kPa (500 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all the reactions occur simultaneously in one reactor or in one bed. Alternatively, the conditions can be controlled such that hydrogenation primarily occurs in one bed and decarboxylation, decarbonylation, and/or hydrodeoxygenation occurs in a second bed. Of course if only one bed is used, then hydrogenation occurs primarily at the front of the bed, while decarboxylation/hydrodeoxygenation occurs mainly in the middle and bottom of the bed. Finally, desired hydrogenation can be carried out in one reactor, while decarboxylation and/or hydrodeoxygenation can be carried out in a separate reactor.

The hydrodeoxygenation reaction consumes hydrogen and produces water byproduct while the decarbonylation and decarboxylation reactions produce CO or $CO_2$ without consuming hydrogen. Hydrogen can be an expensive material to generate or purchase and so minimizing hydrogen consumption provides an economic advantage. Influencing the relative amounts of each reaction occurring in the deoxygenation zone to favor those which do not consume hydrogen allows for the same amount of product with less hydrogen consumption and thus less expense. Adding greater than 1000 to about 2500 wt.-ppm of a sulfur containing compound unexpectedly shifted the relative ratios of the decarbonylation, decarboxylation and hydrodeoxygenation reactions to favor the decarbonylation and decarboxylation at the expense of the hydrodeoxygenation reaction. The sulfur is measured as elemental sulfur, regardless of the compound containing the sulfur. While all three reactions continue to occur, a greater portion of the product is formed through the decarbonylation and decarboxylation routes which do not consume hydrogen. An overall cost savings is achieved. In another embodiment, from about 1100 to about 2500 wt.-ppm of a sulfur containing compound is added to the feed or the reaction mixture of the deoxygenation zone. In yet another embodiment, from about 1500 to about 2500 wt.-ppm of a sulfur containing compound is added to the feed or the reaction mixture of the deoxygenation zone. Suitable sulfur containing components include, but are not limited to, dimethyl disulfide, dibutyl disulfide, and hydrogen sulfide. The sulfur containing component may be part of the hydrogen stream such as hydrogen from hydrocracking units or hydrotreating units, or may be sulfur compounds removed from kerosene or diesel, and disulfide oils removed from sweetening units such as Merox™ units. As an added advantage, the sulfur containing component also operates to maintain the deoxygenation catalyst in a sulfided state, although much less sulfur is typically used to maintain the catalyst in a sulfided state. Greater than 1000 ppm of sulfur containing component is in excess of what is typically required to maintain the catalyst in a sulfided state, but unexpectedly operates to shift the ratio of competing reactions to those reactions which do not consume hydrogen. The sulfur may be added to the feedstock or may be introduced into the deoxygenation reactor separately from the feedstock.

Lower operating pressures also favorably drives the decarboxylation and decarbonylation reactions as compared to the hydrodeoxygenation reaction. The lower operating pressure achievable with one embodiment described below combined with sufficient addition of a sulfur containing compound even further reduces hydrogen consumption while still producing sufficient converted product.

In another embodiment, it is additionally advantageous to add water to the renewable feedstock. Of course because of the operating temperatures, the water would be in the form of vaporous steam. The steam would comprise from about 5 to about 30 mass-% or from about 10 to about 20 mass-% of the feedstock. We believe the steam has the effect of still further reducing the hydrogen consumption in the deoxygenation zone by actually reacting to generate hydrogen reactant in situ. The catalyst used in the deoxygenation zone may catalyze the water gas shift reaction in addition to the deoxygenation reactions. If excess water is present in the reaction mixture, as decarbonylation produces carbon monoxide, the carbon monoxide will undergo the water gas shift reaction with the excess water and produce carbon dioxide and hydrogen. The hydrogen is then available for hydrogenation and hydrodeoxygenation. In another embodiment, the water could be added to the deoxygenation zone as a quench. The water could be added at the inlet or at intermediate locations, or both.

The reaction product from the deoxygenation reactions will comprise a liquid portion and a gaseous portion. The liquid portion comprises a hydrocarbon fraction which is largely n-paraffins and have a high cetane number. The gaseous portion comprises hydrogen, carbon dioxide, carbon monoxide, water vapor, propane and sulfur components such as hydrogen sulfide. It is possible to separate and collect the liquid portion as diesel product without further reactions. However, in most climates, at least a portion of the n-paraffin liquid hydrocarbon fraction will need to be isomerized to contain some branched-paraffins. Therefore the optional hot high pressure hydrogen stripper and the isomerization zone discussed below will often be employed to form a diesel product containing some branched-paraffins and having better cold flow properties.

The effluent from the deoxygenation reactor may be conducted to a hot high pressure hydrogen stripper. One purpose of the hot high pressure hydrogen stripper is to separate the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The temperature may be controlled in a limited range to achieve the desired separation and the pressure may be maintain at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C.

The effluent enters the hot high pressure stripper and the gaseous components, are carried with the hydrogen stripping gas and separated into an overhead stream. Additional hydrogen is used as the stripping gas. The remainder of the deoxygenation effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below.

Hydrogen is a reactant in at least some of the reactions above, and to be effective, a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased allowing a greater amount of throughput of material through the reactor in a given period of time.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1.

Although this hydrocarbon fraction is useful as a diesel boiling range fuel, because it comprises essentially n-paraffins, it will have poor cold flow properties. If it is desired to improve the cold flow properties of the liquid hydrocarbon fraction, then the entire reaction product can be contacted with an optional isomerization catalyst under isomerization conditions to at least partially isomerize the n-paraffins to branched paraffins. The effluent of the second reaction zone, the isomerization zone, is a branched-paraffin-rich stream.

By the term "rich" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization can be carried out in a separate bed of the same reaction zone, i.e. same reactor, described above or the isomerization can be carried out in a separate reactor. For ease of description the following will address the embodiment where a second reactor is employed for the isomerization reaction. The hydrocarbon stream (the hydrogen stripped product of the deoxygenation reaction zone) is contacted with an isomerization catalyst in the presence of hydrogen at isomerization conditions to isomerize the normal paraffins to branched paraffins. Only minimal branching is required, enough to overcome cold-flow problems of the normal paraffins. Since attempting for significant branching runs the risk of high degree of undesired cracking, the predominant isomerized product is a mono-branched hydrocarbon.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials may include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. No. 5,981,419 and U.S. Pat. No. 5,908,134 teach a suitable bifunctional catalyst which comprises: (a) a porous crystalline material isostructural with beta-zeolite selected from boro-silicate (BOR-B) and boro-aluminosilicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

The final effluent stream, i.e. the stream obtained after all reactions have been carried out, is now processed through one or more separation steps to obtain a purified hydrocarbon stream useful as a diesel boiling range fuel. With the final effluent stream comprising both a liquid component and a gaseous component, various portions of which are to be recycled, multiple separation steps may be employed. For example, hydrogen is first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a stripping gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the oxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the final effluent after the removal of hydrogen still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization.

The liquid component contains the hydrocarbons useful as diesel boiling range fuel as well as smaller amounts of naphtha and LPG. The separated liquid component may be recovered as diesel boiling range fuel or it may be further purified in a product stripper which separates lower boiling components and dissolved gases from the diesel product containing $C_8$ to $C_{24}$ normal and mono-branched alkanes. Suitable operating conditions of the product stripper include a temperate of from about 20 to about 200° C. at the overhead and a pressure from about 0 to about 1379 kPa absolute (0 to 200 psia).

The LPG/Naphtha stream may be further separated in a debutanizer or depropanizer in order to separate the LPG into an overhead stream, leaving the naphtha in a bottoms stream. Suitable operating conditions of this unit include a temperate of from about 20 to about 200° C. at the overhead and a pressure from about 0 to about 2758 kPa absolute (0 to 400 psia). The LPG may be sold as valuable product or may be used as feed to a hydrogen production facility. Similarly, the naphtha may be used as feed to a hydrogen production facility.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide is not removed, its concentration would quickly build up and effect the operation of the isomerization zone. The carbon dioxide can be removed from the hydrogen by means well known in the art such as absorption with an amine, reaction with a hot carbonate solution, pressure swing absorption, etc. If desired, essentially pure carbon dioxide can be recovered by regenerating the spent absorption media.

Similarly, the sulfur containing component such as hydrogen sulfide is present to both maintain the sulfided state of the deoxygenation catalyst and to control the relative amounts of the decarboxylation and decarbonylation reactions as compared to hydrodeoxygenation reaction that are all occurring in the deoxygenation zone. The amount of sulfur is controlled to be sufficient to influence the ratios of the competing reactions and so if excess sulfur is present, all or at least the excess may be removed before the hydrogen is recycled so that the sulfur containing components are recycled in the correct amount. The sulfur containing components may be removed using techniques such as adsorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide and the sulfur containing compound may be recycled to the reaction zone where hydrogenation primarily occurs and/or to any subsequent beds/reactors. The recycle stream may be introduced to the inlet of the reaction zone and/or to any subsequent beds/reactors. One benefit of the hydrocarbon recycle is to control the temperature rise across the individual beds. However, as discussed above, the amount of hydrocarbon recycle may be determined based upon the desired hydrogen solubility in the reaction zone and not based upon temperature control. Increasing the hydrogen solubility in the reaction mixture allows for successful operation at lower pressures, and thus reduced cost.

The following embodiment is presented in illustration of this invention and is not intended as an undue limitation on the generally broad scope of the invention as set forth in the claims. First the process is described in general as with reference to FIG. 1. Then the process is described in more detail with reference to FIG. 2.

Turning to FIG. 1, 1100 wt. ppm of sulfur 100 as hydrogen sulfide is injected into renewable feedstock 102 which then enters deoxygenation reaction zone 104 along with recycle hydrogen 126. Deoxygenated product 106 is stripped in hot hydrogen stripper 108 using hydrogen 114a. Carbon oxides and water vapor are removed with hydrogen in overhead 110. Stripped deoxygenated product 115 is passed to isomerization zone 116 along with make-up hydrogen 114b. Isomerized product 118 is combined with overhead 110 and passed to product recovery zone 120. Carbon oxide stream 128, light ends stream 130, water byproduct stream 124, hydrogen stream 126, and branched paraffin-rich product 122 are removed from product recover zone 120. Branched paraffin-rich product 122 may be collected for use as diesel boiling range fuel and hydrogen stream 128 is recycled to both the deoxygenation reaction zone 104 and isomerization zone 116.

Figure 2:
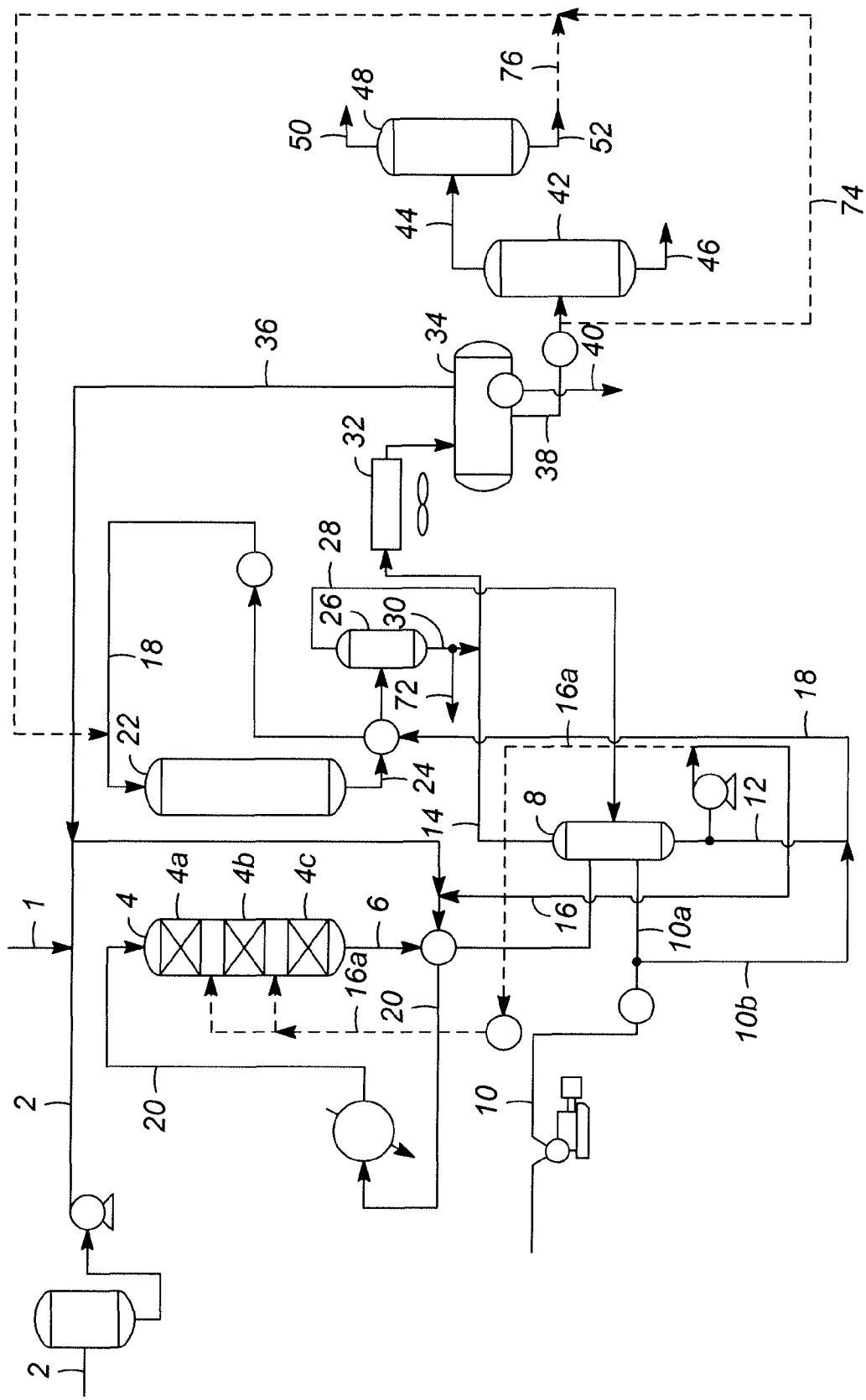

Turning to FIG. 2, the process begins with 1100 wt. ppm of sulfur 1 as hydrogen sulfide being injected into renewable feedstock 2 which may pass through an optional feed surge drum. The feedstock stream is combined with recycle stream 16 to form combined feed stream 20, which is heat exchanged with reactor effluent and then introduced into deoxygenation reactor 4. The feedstock contains greater than 1000 ppm of a sulfur containing component such as hydrogen sulfide. The sulfur-containing compound may be added to the feedstock, or may be added directly to the reactor containing the reaction mixture. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation, decarbonylation and hydrodeoxygenation of the feedstock to remove oxygen. Deoxygenation reactor effluent stream 6 containing the products of the deoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 6 is directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is stripped from the liquid component of deoxygenation reactor effluent 6 using make-up hydrogen 10a and recycle hydrogen 28. The gaseous component comprising hydrogen, vaporous water, carbon monoxide, carbon dioxide and possibly some propane, is separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and/or between beds 4b and 4c in order, or example, to aid in temperature control. The remainder of hot high pressure hydrogen stripper bottoms in stream 12 is combined with hydrogen stream 10b to form combined stream 18 which is routed to isomerization reactor 22. Stream 18 may be heat exchanged with isomerization reactor effluent 24.

The product of the isomerization reactor containing a gaseous portion of hydrogen and propane and a branched-paraffin-rich liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44 with the remainder, the diesel range components, being withdrawn from product stripper 42 in line 46. Stream 44 is introduced into fractionator 48 which operates to separate LPG into overhead 50 leaving a naphtha bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, carbon dioxide and propane. Because of the cost of hydrogen, it is desirable to recycle the hydrogen and possibly the hydrogen sulfide to deoxygenation reactor 4, but it is not desirable to circulate the carbon dioxide. Therefore it is advantageous to separate the carbon dioxide before recycling vapor stream 36. Hydrogen and hydrogen sulfide in vapor stream 36 may be recycled to the deoxygenation reaction zone.

The following example demonstrates the shift in the competing reactions occurring in the deoxygenation zone. Adding greater than 1000 to about 2500 ppm of a sulfur containing compound unexpectedly shifted the relative ratios of the decarbonylation, decarboxylation and hydrodeoxygenation reactions to favor the decarbonylation and decarboxylation at the expense of the hydrodeoxygenation reaction. The decarboxylation and decarbonylation reactions produce carbon dioxide as a product. The formation of carbon dioxide reduces the number of carbon atoms in the hydrocarbon generated from the decarboxylation and decarbonylation reactions as compared to a hydrocarbon generated using hydrodeoxygenation reaction. Therefore, in this example, the relative amounts of the reactions may be measured through monitoring the ratio of normal $C_{17}$ paraffins generated to normal $C_{18}$ paraffins generated. Another way of measuring the relative amounts of the reactions occurring is to monitor the carbon oxides produced, since only the decarboxylation and decarbonylation reactions produce carbon oxides, while hydrodeoxygenation produces water.

A feedstock of canola oil containing 2500 ppm of sulfur (in the form of dimethyl disulfide) was contacted at 1 hr$^{-1}$ LHSV$_{FF}$ with a nickel and molybdenum dispersed on a active alumina (catalyst at 316° C. and 3347 kPa gauge (500 psig). The hydrogen to canola oil ratio was 4000 SCF/B$_{FreshFeed}$ for a first portion of the test, and then the ratio was changed to 5000 SCF/B$_{FreshFeed}$ for the remainder of the test. At about 1900 hours on stream the test was restarted with only 500 ppm sulfur, also in the form of dimethyl disulfide, in the feedstock. The recycle ratio of deoxygenated product to feedstock was 4:1.

Figure 3:
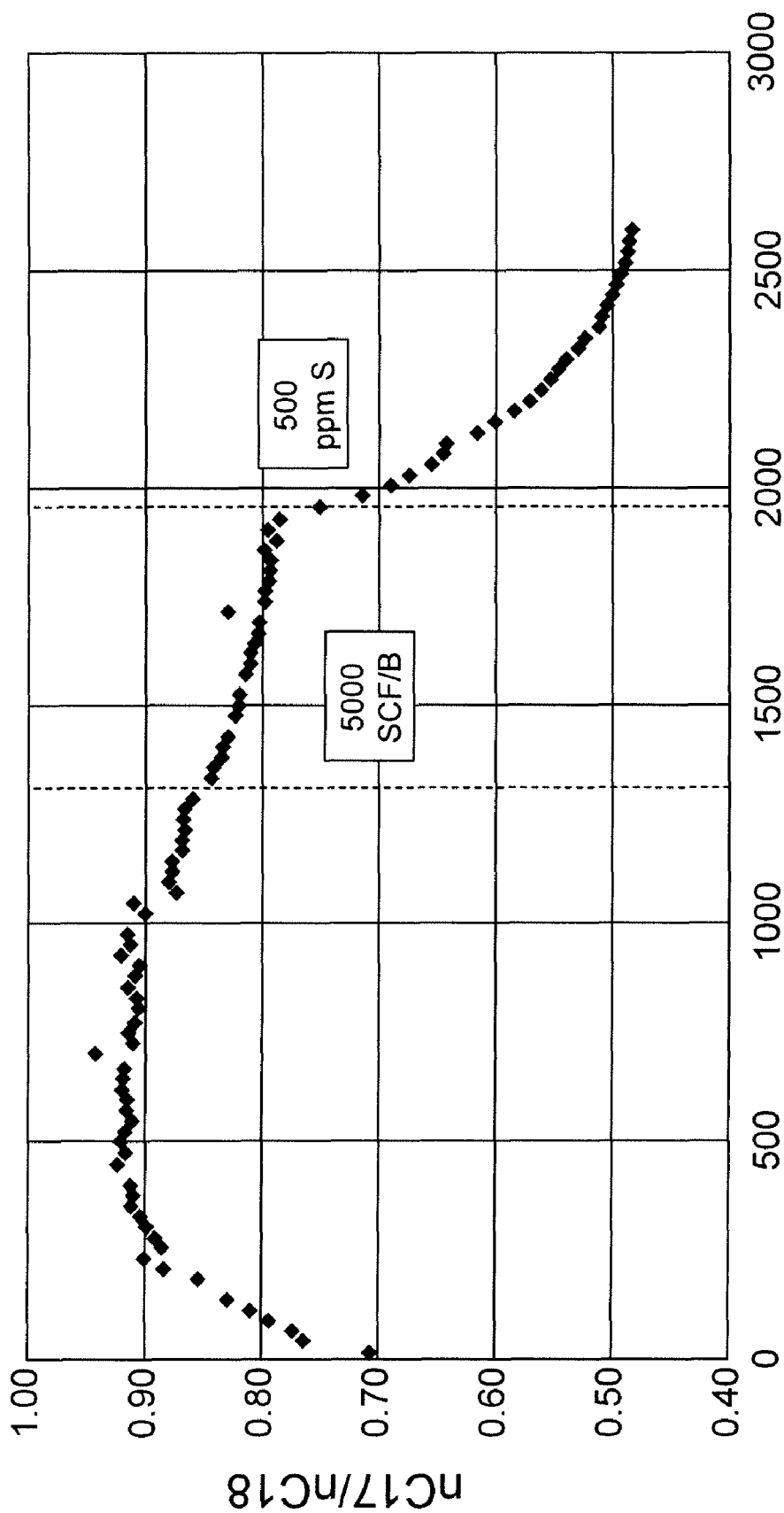
FIG. 3 is a plot of the ratio of nC17/nC18 versus hours on stream corresponding to the example and showing the surprising results of increased decarboxylation and carbonylation as compared to hydrodeoxygenation with 2500 ppm sulfur as compared to with 500 ppm sulfur.

FIG. 3 shows the surprising results of the portion of the test where the feedstock contained 2500 ppm sulfur as compared to the portion of the run that contained only 500 ppm sulfur. As soon as the amount of sulfur in the feedstock was reduced, the ratio of $nC_{17}/nC_{18}$ began to decline indicating that more $nC_{18}$ was being produced relative to nC17 as compared to when the sulfur was at 2500 ppm in the feedstock. It is the hydrodeoxygenation reaction that produces the $nC_{18}$, and the increase indicates that more of the feedstock is now being converted via the hydrodeoxygenation reaction. The hydrodeoxygenation reaction consumes hydrogen and is therefore a more costly route to the desired hydrocarbon than is the decarbonylation and decarboxylation reactions which do not consume hydrogen. FIG. 3 demonstrates that high levels of sulfur shift the balance of the competing reactions to favor the decarbonylation and decarboxylation reactions over the hydrodeoxygenation reaction.

Figure 4:
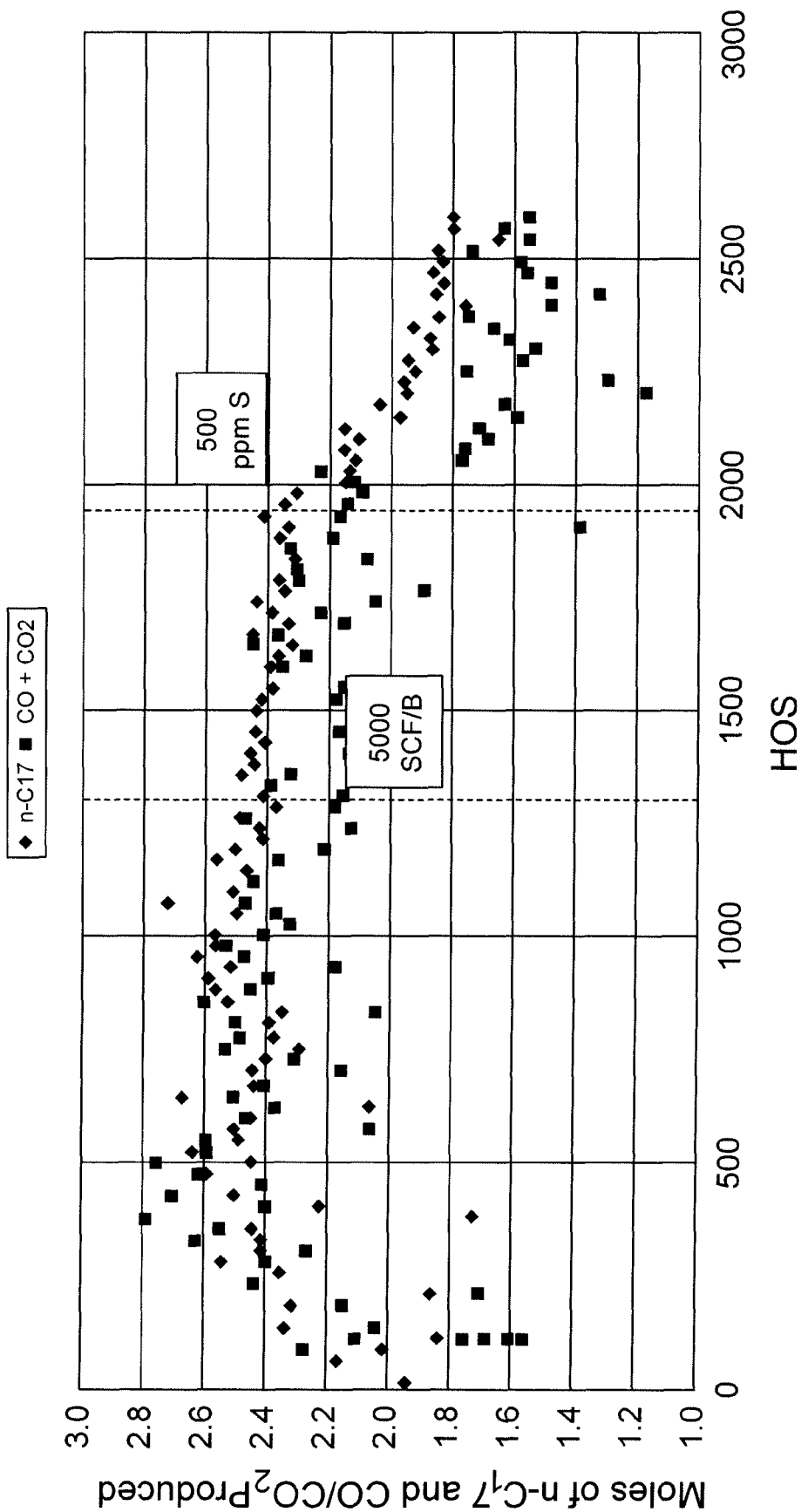
FIG. 4 is a plot of the percent carbon oxides generated versus hours on stream corresponding to the example and showing the surprising results of increased decarboxylation and carbonylation as compared to hydrodeoxygenation with 2500 ppm sulfur as compared to with 500 ppm sulfur.

FIG. 4 is a plot of data from the same experiment, however in FIG. 4 the percent carbon monoxide and carbon dioxide are plotted versus hours on stream. Again the plot shows that upon reducing the sulfur from 2500 ppm in the feedstock to 500 ppm in the feedstock, the amount of carbon oxides sharply decreased indicating a reduction in the amount of decarbonylation and decarboxylation relative to hydrodeoxygenation occurring in the deoxygenation reactor.

The invention claimed is:

1. A process for producing a paraffin-rich diesel product from a renewable feedstock comprising treating the feedstock in a first reaction zone by hydrogenating and deoxygenating the feedstock using a catalyst at reaction conditions in the presence of hydrogen and at least one sulfur containing component in an amount greater than 1000 wt.-ppm sulfur, measured as elemental sulfur, to provide a first reaction zone product stream comprising hydrogen, carbon dioxide, and a hydrocarbon fraction comprising paraffins having from about 8 to about 24 carbon atoms; separating, in a hot high pressure hydrogen stripper, a gaseous stream comprising hydrogen and at least a portion of the water and carbon oxides from the first reaction zone product stream and a remainder stream comprising at least the n-paraffins from the first reaction zone product stream; introducing the remainder stream to a second reaction zone to contact an isomerization catalyst at isomerization conditions to isomerize at least a portion of the paraffins and generate a branched paraffin-rich stream.

2. The process of claim 1 further comprising:
   a) combining the branched paraffin-rich stream and the gaseous stream to form a combined stream;
   b) cooling the combined stream and separating a gaseous component comprising at least hydrogen and carbon dioxide from a liquid hydrocarbon component; and
   c) recovering the liquid hydrocarbon component.

3. The process of claim 2 further comprising recycling the gaseous component to the first reaction zone.

4. The process of claim 3 further comprising separating carbon dioxide from the gaseous component stream prior to recycling the gaseous component to the first reaction zone.

5. The process of claim 3 further comprising separating sulfur containing component from the gaseous component stream prior to recycling the gaseous component to the first reaction zone.

6. The process of claim 5 further comprising separating the sulfur containing component to the first reaction zone.

7. The process of claim 2 further comprising separating the liquid hydrocarbon component into an LPG and naphtha stream and a diesel boiling range stream and separating the LPG and naphtha stream into an LPG stream and a naphtha stream.

8. The process of claim 7 further comprising recycling at least a portion of the naphtha steam to the second reaction zone.

9. The process of claim 1 further comprising removing at least a portion of the hydrogen from the branched paraffin-rich stream and recycling the hydrogen removed from the branched paraffin-rich stream to the hot high pressure hydrogen stripper.

10. The process of claim 1 further comprising recycling a portion of the remainder stream comprising a least the paraffins to the first reaction zone at a volume ratio of recycle to feedstock in the range of about 2:1 to about 8:1.

11. The process of claim 10 wherein the reaction conditions in the first reaction zone include a temperature of about 40° C. to about 400° C. and a pressure of about 689 kPa absolute (100 psia) to about 4826 kPa absolute (700 psia).

12. The process of claim 1 wherein the amount of sulfur containing component is from about 1100 wt.-ppm to about 2500 wt.-ppm of the renewable feedstock.

13. The process of claim 1 wherein the amount of sulfur containing component is from about 1500 wt.-ppm to about 2500 wt.-ppm of the renewable feedstock.

14. The process of claim 1 wherein the feedstock further comprises from about 5 to about 30 mass-% steam.

15. The process of claim 1 wherein the reaction conditions in the first reaction zone include a temperature of about 40° C. to about 400° C. and a pressure of about 689 kPa absolute (100 psia) to about 13,790 kPa absolute (2000 psia).

16. The process of claim 1 further comprising recycling at least a portion of the branched paraffin-rich stream to the second reaction zone.

17. The process of claim 1 wherein the isomerization conditions in the second reaction zone include a temperature of about 40° C. to about 400° C. and a pressure of about 689 kPa absolute (100 psia) to about 13,790 kPa absolute (2000 psia).

18. The process of claim 1 wherein the hot high pressure hydrogen stripper is operated at a temperature of about 40° C. to about 300° C. and a pressure of about 689 kPa absolute (100 psia) to about 13,790 kPa absolute (2000 psia).

19. The process of claim 1 wherein the second reaction zone is operated at a pressure at least 345 kPa absolute (50 psia) greater than that of the first reaction zone.

20. The process of claim 1 further comprising treating a petroleum derived hydrocarbon in the first reaction zone with the renewable feedstock.

21. The process of claim 1 wherein the renewable feedstock is selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, tallow, yellow and brown greases, lard, train oil, fats in milk, fish oil, algal oil, sewage sludge, ratanjoy oil, wild castor oil, jangli oil erandi oil, mohuwa oil, karanji honge oil, neem oil, and mixtures thereof.

22. The process of claim 1 wherein the renewable feedstock further comprises at least one co-feed selected from the group consisting of petroleum derived hydrocarbons, spent motor oils, industrial lubricants, used paraffin waxes, liquids derived from the gasification of coal followed by a downstream liquefaction step, liquids derived from the gasification of biomass followed by a downstream liquefaction step, liquids derived from the gasification of natural gas followed by a downstream liquefaction step, liquids derived from thermal or chemical depolymerization of waste plastics, and synthetic oils generated as byproducts from petrochemical and chemical processes.

23. The process of claim 1 further comprising introducing a make up hydrogen stream to the hot high pressure hydrogen stripper.

24. The process of claim 1 further comprising combining a fresh hydrogen stream with the remainder stream.

25. The process of claim 1 further comprising pre-treating the feedstock in a pretreatment zone at pretreatment conditions to remove at least a portion of contaminants in the feedstock.

26. A method for controlling the relative amounts of decarboxylation, decarbonylation and hydrodeoxygenation of a petroleum feedstock, a renewable feedstock, or a mixture of a petroleum feedstock and a renewable feedstock occurring in a deoxygenation reactor comprising:
　a) contacting the renewable feedstock with a catalyst in a deoxygenation reaction zone at reaction conditions in the presence of hydrogen;
　b) adding and at least one sulfur containing component in an amount greater than 1000 ppm sulfur, measured as elemental sulfur, to the deoxygenation reaction zone;
　c) generating a first reaction zone product stream comprising hydrogen, carbon dioxide, and paraffins having from about 8 to about 24 carbon atoms;
　d) separating, in a hot high pressure hydrogen stripper, a gaseous stream comprising hydrogen and at least a portion of the water and carbon oxides from the first reaction zone product stream and a remainder stream comprising at least the n-paraffins from the first reaction zone product stream; and
　e) introducing the remainder stream to a second reaction zone to contact an isomerization catalyst at isomerization conditions to isomerize at least a portion of the paraffins and generate a branched paraffin-rich stream.

27. A method for controlling the amount of paraffins having 17 carbon atoms in the effluent of a process producing paraffin diesel product from a renewable feedstock, said process for controlling comprising:
　a) contacting the renewable feedstock with a catalyst in a deoxygenation reaction zone at reaction conditions in the presence of hydrogen;
　b) adding and at least one sulfur containing component in an amount greater than 1000 ppm sulfur, measured as elemental sulfur, to the deoxygenation reaction zone;
　c) generating a first reaction zone product stream comprising hydrogen, carbon dioxide, and paraffins having from about 8 to about 24 carbon atoms wherein the first reaction zone product stream is depleted in carbon monoxide;
　d) separating, in a hot high pressure hydrogen stripper, a gaseous stream comprising hydrogen and at least a portion of the water from the first reaction zone product stream and a remainder stream comprising at least the n-paraffins from the first reaction zone product stream; and e) introducing the remainder stream to a second reaction zone to contact an isomerization catalyst at isomerization conditions to isomerize at least a portion of the paraffins and generate a branched paraffin-rich stream.

28. A process for producing a paraffin-rich diesel product from a renewable feedstock comprising treating the feedstock in a first reaction zone by hydrogenating and deoxygenating the feedstock using a catalyst at reaction conditions in the presence of hydrogen, water in an amount from about 5 to about 30 mass-% of the feedstock and at least one sulfur containing component in an amount greater than 1000 wt.-ppm sulfur, measured as elemental sulfur, to provide a first reaction zone product stream comprising hydrogen, carbon dioxide, and a hydrocarbon fraction comprising paraffins having from about 8 to about 24 carbon atoms.

* * * * *